United States Patent
O'Dell

(10) Patent No.: US 7,370,607 B2
(45) Date of Patent: May 13, 2008

(54) LOCKING FINIAL AND RECEPTACLE INCORPORATING THE SAME

(75) Inventor: Furman O'Dell, Evergreen, CO (US)

(73) Assignee: Woodstream Corporation, Lititz, PA (US)

( * ) Notice: Subject to any disclaimer, the term of this patent is extended or adjusted under 35 U.S.C. 154(b) by 241 days.

(21) Appl. No.: 10/908,947

(22) Filed: Jun. 1, 2005

(65) Prior Publication Data

US 2006/0272585 A1    Dec. 7, 2006

(51) Int. Cl.
*A01K 39/01*    (2006.01)
(52) U.S. Cl. .................. 119/52.3; 119/57.9; D30/128
(58) Field of Classification Search ............ 119/51.01, 119/52.1, 52.2, 52.3, 57.8, 57.9, 61.57, 428, 119/429, 459, 464; D30/124–128
See application file for complete search history.

(56) References Cited

U.S. PATENT DOCUMENTS

| | | | |
|---|---|---|---|
| 1,061,809 A | 5/1913 | Bocorselski et al. | |
| 1,204,457 A | 11/1916 | Kreeft | |
| 1,639,278 A | 8/1927 | Wharton et al. | |
| 2,293,719 A | 8/1942 | Eby | |
| 2,424,444 A | 7/1947 | Fox | |
| 2,524,649 A | 10/1950 | Buhler | |
| 3,456,234 A | 7/1969 | Lyman | |
| 3,806,860 A | 4/1974 | Flammini | |
| 4,102,308 A * | 7/1978 | Kilham | 119/52.3 |
| 4,328,605 A | 5/1982 | Hutchison et al. | |
| 7,040,251 B2 * | 5/2006 | Fort, II | 119/57.8 |

FOREIGN PATENT DOCUMENTS

SE    125030    5/1949

OTHER PUBLICATIONS

"Barreloc", "Cordloc", Toaster Ellipse, all printed from Waterbury Buckle website www.buckle-hardware.com/cord-locks.html (2 pages).

* cited by examiner

*Primary Examiner*—T. Nguyen
(74) *Attorney, Agent, or Firm*—Jacobson Holman PLLC

(57) ABSTRACT

A receptacle that is adapted to be suspended from a support member includes a housing and a lid to enclose the interior thereof. A flexible cable is secured to the housing and extends though a passageway in a mounting member on the lid so that the lid can move between an open and a closed position. A latch mechanism is associated with the mounting member and can release to allow the lid to slide on the cable and can latch to resist sliding movement of the lid thereby to open the housing for access and close it for use.

19 Claims, 2 Drawing Sheets

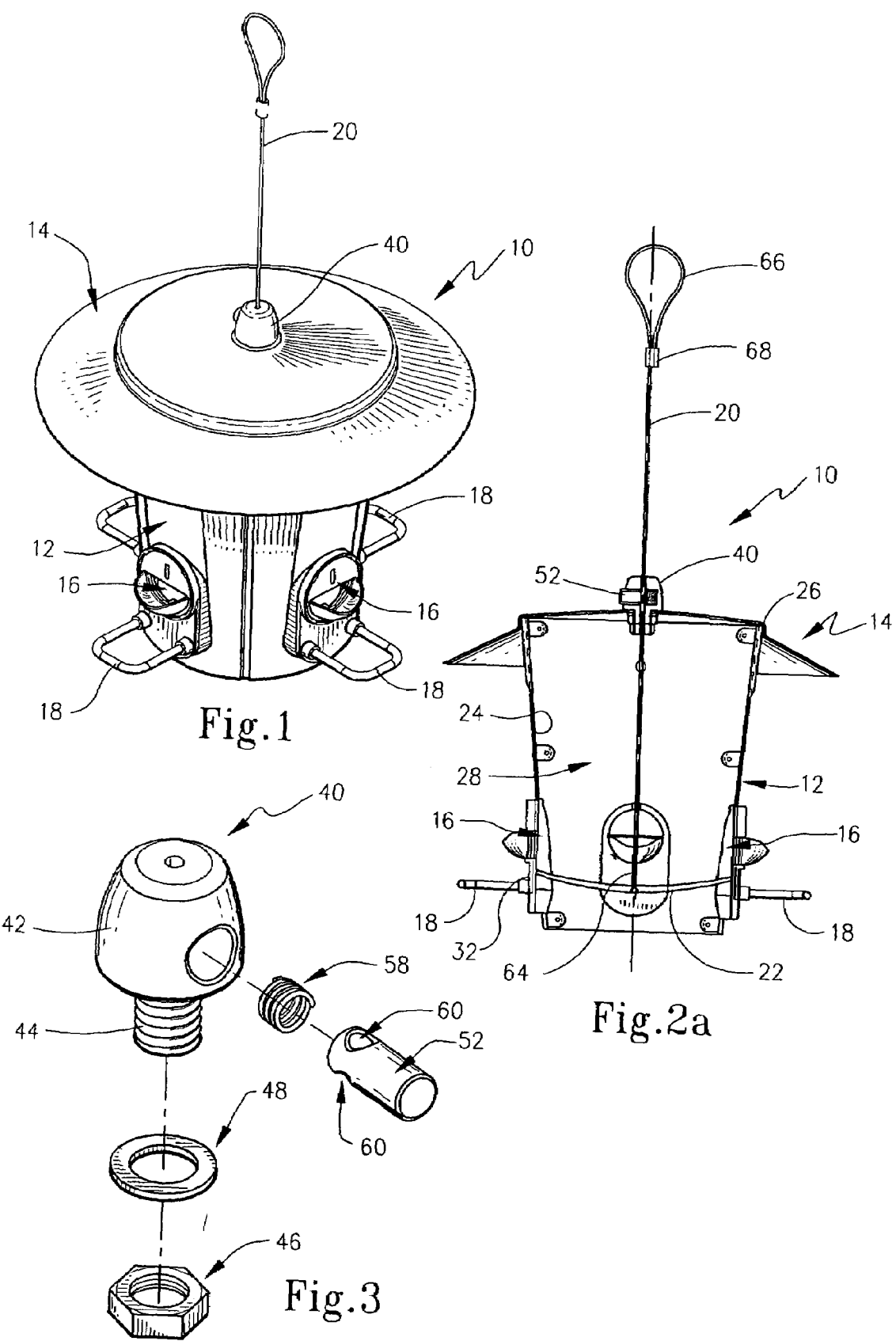

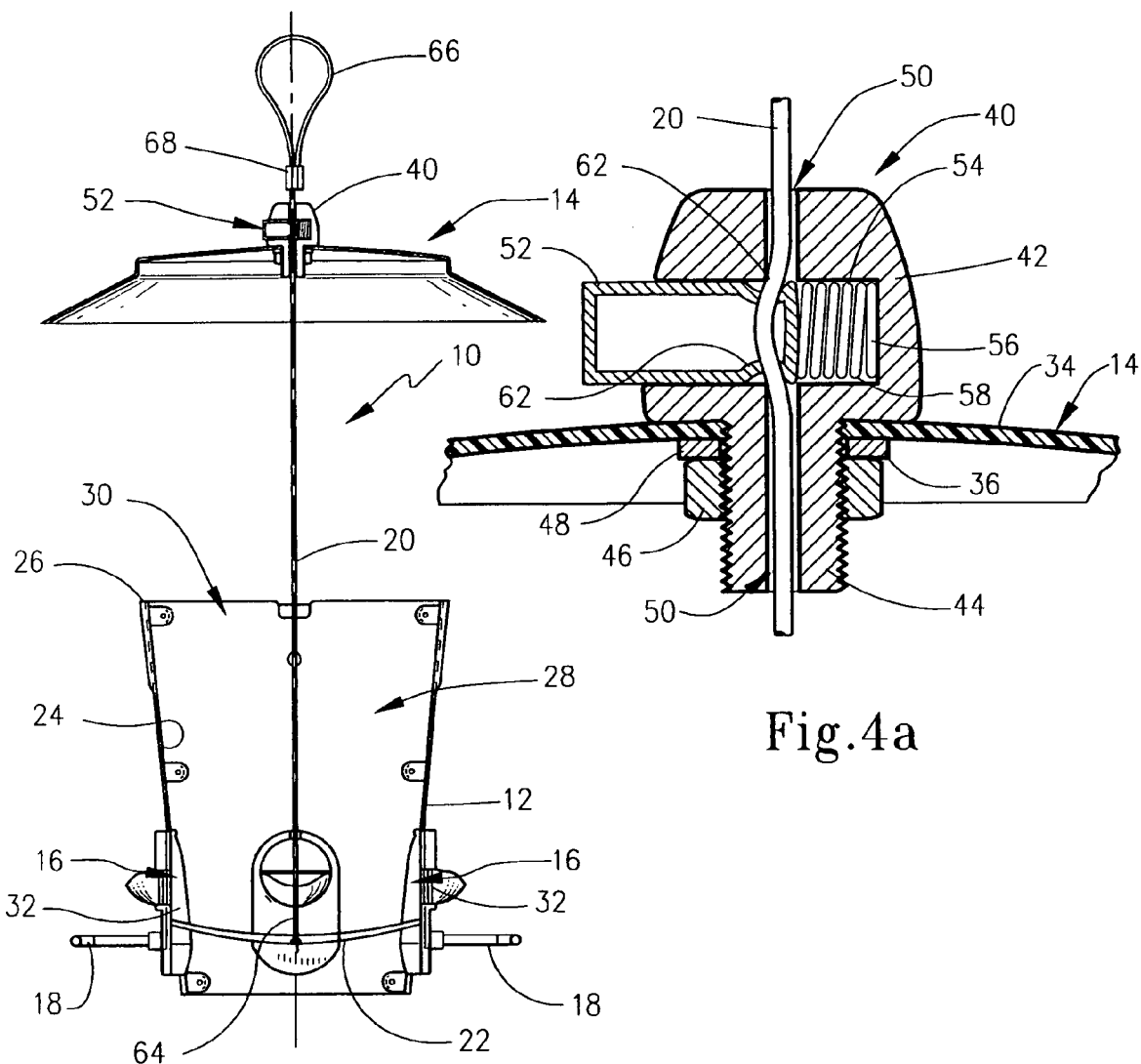
Fig.4a
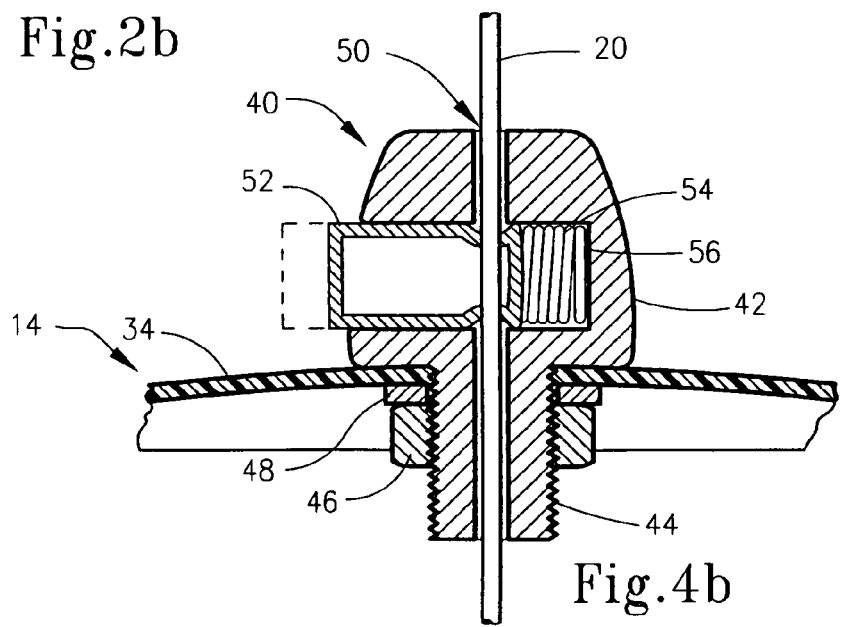
Fig.2b
Fig.4b

LOCKING FINIAL AND RECEPTACLE INCORPORATING THE SAME

BACKGROUND OF THE INVENTION

Since the domestication of animals, in general, humans have taken upon themselves the care and maintenance of a variety of living things. Such living things include, for example, animals, birds and insects. Often, people desire to provide care and maintenance for wildlife, such as wild birds, wherein either feeding stations or houses are provided for the birds. As such, a wide variety of feeders and nesting facilities have been developed and employed in the past. In some cases, these feeders and nesting facilities are suspended from a support member such as a tree branch or a structural beam.

Where feeding stations, e.g. birdfeeders, are provided for living things, such feeding stations typically are in the form of a receptacle that includes a food reservoir for containing solid or liquid nourishment. An access opening is provided to allow access for filling the reservoir, and a lid is typically provided to close the reservoir after it has been filled. One disadvantage in many prior art structures is that the receptacle must be taken down from its support in order to refill the reservoir. Moreover, the connecting structures of the lid to the housing are sometimes unwieldy, especially where a large feeding receptacle is employed. Therefore, a more convenient structure for interconnecting a lid to a receptacle is useful and would provide advantages over the prior art when the lid structure is easily moveable between open and closed positions.

Accordingly, there remains a need to provide a new and improved receptacles for the care and maintenance of living things, such as bird houses, bird feeders, insect feeders, bird baths and the like. The present invention is directed to meeting these needs by providing a locking finial that secures a lid to a housing to form the receptacle.

SUMMARY OF THE DISCLOSURE

The present invention relates to a receptacle used for the care and maintenance of living things. In the illustrated exemplary embodiment, this receptacle is adapted to be suspended from a support member and includes a housing having an interior with an access opening therein. A lid is adapted to be moved from an open position permitting access to the interior through the access opening and a closed position enclosing the interior such that the housing and the lid together form an assembled unit. A mounting member is then disposed on the lid with this mounting member including a passageway extending therethrough. A flexible cable is secured at a first end portion to the housing and has an opposite second end portion adapted to secure to the support member. The cable extends through the passageway in the mounting member.

A latch mechanism is associated with the mounting member and is moveable between a release position wherein the cable may slide in the passageway and a latch position wherein sliding movement of the cable in the passageway is resisted. Thus, when the lid is in the closed position and the latch mechanism is in the latch position, the lid is retained in the closed position. However, when the latch mechanism is in the release position, the lid can be moved between the closed position and the open position.

In the exemplary embodiment, the housing includes a bottom panel and a surrounding sidewall extending upwardly from the bottom panel so that the access opening is located opposite the bottom panel and may be defined by an upper rim of the sidewall. When the assembled unit is a birdfeeder, for example, the sidewall may have dispensing openings formed therein whereby food may be dispensed therethrough. The lid is dome shaped in configuration and may have a margin that extends outwardly of the sidewall to form an overhang.

In the exemplary embodiment, a first end portion of the cable is affixed to the bottom panel, and the second end portion of the cable is formed as a closed loop wherein a portion of the cable is looped back onto itself and secured by a retainer. However, other connections of the cable to the housing are contemplated. The cable can be any suitable flexible material, such as a single wire or woven wire strand, cords, string and the like including both manmade and natural filaments.

One aspect of the invention, as noted above, is that a latch mechanism be associated with the mounting member with this latch structure being moveable between a release position wherein the mounting member may slide along the cable and a latch position wherein sliding movement of the cable relative to the mounting member is resisted. In the exemplary embodiment, the latch mechanism is formed by a bore that intersects the passageway and a plunger that is slideably received in the bore so that it may move between a retracted position and an extended position. The plunger has a port that registers with the passageway and the retracted position with the cable extending through the port. The plunger is spring biased toward the extended position so that, upon its release, the plunger binds against the cable thereby to resist sliding movement of the cable in the passageway.

In the exemplary embodiment, the mounting member is in the form of a locking finial that has an enlarged head portion with a shaft extending therefrom. A passageway is formed axially through the shaft and through the enlarged head portion so that the cable may slide in this passageway. The bore is then formed in the enlarged head portion. The shaft may be threaded, and the lid can have a lid opening sized and adapted to receive the shaft therethrough so that a threaded fastener may threadably engage the shaft to retain the mounting member on the lid.

In addition to disclosing a receptacle adapted to be suspended from a support member for the care and maintenance of living things, it should be understood that the disclosure also relates to a locking finial of the type described above. In addition, this disclosure teaches a method of opening and closing a receptacle with the steps of this method being those inherent in the structure described above.

The method disclosed includes the step of connecting one end portion of a cable to a housing wherein the cable has a second end portion adapted to secure to a support member. The cable is extended through a lid that is moveable between an open position permitting access to the interior of the housing and a closed position enclosing the interior. A latch mechanism is associated with the cable and is located exteriorly of the housing with this latch mechanism being moveable between a release state wherein the lid may slide along the cable and a latch state wherein sliding movement of the lid relative to the cable is resisted. The method then includes the step of advancing the latch mechanism to the release state and sliding of the lid between the open and closed positions. The latch mechanism may be advanced to the latch state to resist movement of the lid relative to the cable.

The following is a detailed description of the exemplary embodiment of the present invention when taken together with the accompanying drawings, in which:

BRIEF DESCRIPTION OF THE DRAWINGS

FIG. 1 is a perspective view of a receptacle, in the form of a birdfeeder, according to the exemplary embodiment of the present invention;

FIG. 2(a) is a side view in cross-section of the birdfeeder of FIG. 1 shown with the lid in a closed position, and FIG. 2(b) is a side view in cross-section of the birdfeeder of FIG. 1 shown with the lid in the open position;

FIG. 3 is an exploded perspective view of the latch member according to the exemplary embodiment of the present invention in the form of a locking finial; and FIG. 4(a) is a side view in cross-section of the assembled finial of FIG. 3 with the latch thereof shown in a latch position, and FIG. 4(b) is a cross-sectional view, similar to FIG. 4(a) of the locking finial, showing the latch thereof in the release position.

DETAILED DESCRIPTION OF THE EXEMPLARY EMBODIMENT

The illustrated exemplary embodiment described herein relates to a receptacle in the form of a birdfeeder. However, it should be understood that the concepts described are applicable to any type of receptacle that is adapted to be suspended from a support member for the care and maintenance of living things. These might include, for example and not limitation, birdfeeders, birdhouses, insect feeders (such as butterfly feeders), squirrel feeders, and birdbaths, to name a few. Thus, while the description provided herein is directed to a birdfeeder, it should be understood at the outset that the inventive concepts are not confined to birdfeeders alone.

With that in mind, and with reference to FIG. 1, a birdfeeder 10 is introduced and includes a housing 12 and a lid 14. Housing 12 includes a plurality of dispensing openings 16 along with associated perches 18. Birdfeeder 10 is adapted to be suspended from a support member (not shown) by means of a flexible cable 18, as described below. Cable 20 is secured at one end portion to housing 12 and has an opposite second end portion adapted to secure to the support member. Cable 20 also extends through a locking finial 40 that is secured to lid 14. The support member may be any convenient structure, such as a tree branch, a building beam, etc.

With reference now to FIGS. 2(a) and 2(b), it may be seen that housing 12 includes a bottom panel 22 and a surrounding sidewall 24 extending upwardly therefrom as an inverted frustum to terminate at an upper rim 26. Thus, housing 12 has an interior 28 provided with an access opening 30 defined by rim 26 so that it is located oppositely of bottom panel 22. Dispensing openings 16 are each fitted with a rotatable feed dispenser 32, for illustrative purposes only. Moreover, it may be seen that lid 14 is dome-shaped and has a margin portion 15 that extends outwardly of side wall 24 so as to provide an overhang for the assembled unit.

As is illustrated in FIGS. 2(a) and 2(b), lid 14 is adapted to be moved between a closed position, shown in FIG. 2(a) and an open position shown in FIG. 2(b). When in the open position, lid 14 permits access to interior 28 through the access opening 30. When in the closed position, lid 14 closes the interior such that the housing and lid together form an assembled unit, shown in FIGS. 1 and 2(a).

A mounting member is disposed on the lid 14, and in this exemplary embodiment, the mounting member is in the form of a locking finial 40. However, this is for illustrative purposes so that it should be understood that other mounting members may be substituted for finial 40. Locking finial 40 is best illustrated in FIGS. 3, 4(a) and 4(b). As is shown in these figures, locking finial 40 includes an enlarged head portion 42 from which a shaft 44 extends in an axial direction. Shaft 44 is threaded so as to receive a threaded fastener in the form of nut 46 and an optional washer 48. As is shown in FIGS. 4(a) and 4(b), lid 14 includes a top panel 34 having a central opening 36 to which shaft 44 may extend and be secured thereby to secure finial 40 onto lid 14. Shaft 44 includes an axial passageway 50 that extends not only longitudinally through shaft 44 but linearly through enlarged head 42, as well. Table 20 then extends through passageway 50 in finial 40.

Whether locking finial 40 or some other mounting member is used, one aspect of this disclosure is that a latch mechanism is provided to releasably grip cable 20. Thus, a latch mechanism is associated with finial 40 with the latch being moveable between a latch position, shown in FIG. 4(a) and a release position such as shown in FIG. 4(b). With reference to FIGS. 3, 4(a) and 4(b), in the exemplary embodiment, the latch mechanism is formed by a spring biased plunger 52 that is received in a transverse bore 54 formed in enlarged head 42 of finial 40. More particularly, bore 54 extends a majority of the distance through enlarged head 42 at generally right angles to passageway 50. Moreover, bore 54 intersects passageway 50 and is sized for close fitted, mated engagement with plunger 52. Bore 54 has an end wall 56, and a spring 58 is interposed between plunger 52 and end wall 56. Thus, spring 58 biases plunger 52 outwardly of bore 54 with the restorative force.

Plunger 52 has a port formed by a pair of facing openings 60 formed through the sidewall thereof. When plunger 52 is moved into the release position, as is shown in FIG. 4(b), cable 20 can extend completely through finial 40 by passing through passageway 50 and through openings 60, as illustrated. In this position, cable 20 can freely slide relative to finial 40. However, upon the release of plunger 52, spring 58 biases plunger 52 outwardly so that cable 20 becomes gripped by plunger 52 and edge 62 formed by the intersection of passageway 50 and bore 54, as illustrated in FIG. 4(a). This latching action is similar to various cord clamps as known in the art.

With reference again to FIGS. 2(a) and 2(b), it should now be appreciated that cable 20 has a first end portion 64 secured to housing 12. By referring to a "cable" it is contemplated that any suitable flexible cord-like member is included. Thus, cable 20 could be a single or multi-strand wire, a string, cord or the like. As is shown in FIGS. 2(a) and 2(b), end portion 64 is secured, in any suitable manner, to bottom panel 22, although any other suitable connection of cable 20 to housing 12 may be employed. A second end portion of flexible cable 20 is adapted to secure to the support member. In the exemplary embodiment, second end portion 66 is in the form of a closed loop formed by looping an end portion of cable 20 onto itself and securing the loop by a retainer 68.

Since finial 40 is secured to lid 14, it should be now appreciated that lid 14 may be moved from the closed position to the open position by depressing plunger 52 of finial 40 and sliding lid 14 along cable 20. When plunger 52 is released, it will tend to retain lid 14 at the selected location along cable 20. Thus, after accessing the interior of housing 12, the user may depress plunger 52 and slide the lid 14 back into the closed position where it will be retained by the latching finial 40.

Moreover, although plunger 52 is depicted as a hollow tubular member, it could just as well be a solid piece. Indeed, it is contemplated that other latch mechanisms could be associated with finial 40 instead of the spring biased plunger 52. That is, any latch that is suitable to prevent finial 40, and thus lid 14, from unwanted sliding on cable 20 could be employed although it is desirable that the latch be simply and easily moveable between the latch position and the release position.

From the foregoing, it should be appreciated that the exemplary embodiment also provides a method of opening and closing a receptacle for the care and maintenance of living things. According to this method, the receptacle includes a housing having an interior and an access opening and includes a lid moveable between an open position permitting access to the interior through the access opening and closed position enclosing the interior such that the housing and lid together form and assembled unit. This method includes any of the steps inherent in the structure described above with respect to the exemplary embodiment.

More particularly, the method includes the step of connecting one end portion of a cable to the housing wherein the cable has a second end portion adapted to secure to the support member. The method then includes the step of extending the cable through the lid and providing a latch member on the cable exteriorly of the housing whereby the latch member is moveable between a release state wherein the lid may slide along the cable and a latch state wherein sliding movement of the lid relative to the cable is resisted. The method includes the step of advancing the latch member to the release state and sliding the lid between the open and closed positions and advancing the latch member to the latch state to resist movement of the lid relative to the cable. According to this method, the latch member may optionally be biased toward the latch state with the restorative force. The step of advancing the latch member to the latch state is then accomplished by allowing the latch member to return to the latch state under influence of the restorative force.

Accordingly, the embodiment of the present invention has been described with some degree of particularity. It should be appreciated, though, that the scope of the claimed invention is set forth in the following claims such that the exemplary embodiment should not limit the scope of the invention. That is, is should be clearly understood that modifications or changes may be made to the exemplary embodiment of the present invention without departing from the inventive concepts contained herein.

What is claimed is:

1. A receptacle adapted to be suspended from a support member for the care and maintenance of living things, comprising:
   (A) a housing having an interior with an access opening therein;
   (B) a lid adapted to be moved from an open position permitting access to the interior through the access opening and a closed position enclosing the interior such that said housing and said lid together form an assembled unit;
   (C) a mounting member disposed on said lid and including a shaft, an enlarged head portion with said shaft extending outwardly therefrom, and a passageway extending axially through said shaft and through said head portion, said head portion having a bore formed partially therethrough that intersects the passageway;
   (D) a flexible cable secured at a first end portion to said housing and having an opposite second end portion adapted to secure to the support member, said cable extending through the passageway in said mounting member; and
   (E) a latch mechanism associated with said mounting member and movable between a release position wherein said cable may slide in the passageway and a latch position wherein sliding movement of said cable in the passageway is resisted, whereby,
      (1) when said lid is in the closed position and said latch mechanism is in the latch position, said lid is retained in the closed position, and
      (2) when said latch mechanism is in the release position, said lid can be moved between the closed position and the open position; and
   said latch mechanism including a plunger slideably received in the bore and a spring element that biases said plunger outwardly from the bore with a restorative force so that said plunger can move between a retracted position and an extended position, said plunger having a port therethrough that registers with the passageway when in the retracted position such that in said release position said cable is received through said port for sliding movement in the passageway, said plunger operative to bind against said cable when in the extended position such that in said latch position sliding movement of said cable in the passageway is resisted.

2. The receptacle according to claim 1 wherein said housing includes a bottom panel and a surrounding side wall extending upwardly from said bottom panel, said access opening being located opposite said bottom panel.

3. The receptacle according to claim 2 wherein said side wall terminates in an upper rim defining said access opening.

4. The receptacle according to claim 2 wherein said assembled unit is a bird feeder, said side wall having dispensing openings formed therein whereby food may be dispensed therethrough.

5. The receptacle according to claim 2 wherein the first end portion of said cable is affixed to said bottom panel.

6. The receptacle according to claim 2 wherein said lid has a margin that extends outwardly of said side wall.

7. The receptacle according to claim 6 wherein said lid is dome-shaped in configuration.

8. The receptacle according to claim 1 wherein said shaft is threaded and wherein said lid has a lid opening sized and adapted to receive said shaft therethrough, and including a threaded fastener adapted to threadably engage said shaft to retain said mounting member on said lid.

9. The receptacle according to claim 1 wherein said mounting member is configured as a finial for said lid.

10. The receptacle according to claim 1 wherein said assembled unit is selected from a group consisting of bird houses, bird feeders, butterfly feeders, and bird baths.

11. A method of opening and closing a receptacle for the care and maintenance of living things, the receptacle being configured to be suspended from a support member and including a housing having an interior and an access opening and a lid movable between an open position permitting access to the interior through the access opening and a closed position enclosing the interior such that said housing and said lid together form an assembled unit, comprising:
   (A) connecting one end portion of a cable to said housing wherein said cable has a second end portion adapted to secure to the support member;
   (B) extending said cable through said lid;

(C) providing a mounting member disposed on said lid and including a passageway extending axially therethrough, said mounting member also having a bore formed partially therethrough that intersects the passageway;

(D) providing a latch mechanism associated with said cable and located exteriorly of said housing, said latch mechanism being movable between a release state in which said lid may slide along said cable and a latch state in which sliding movement of said lid relative to said cable is resisted, said latch mechanism including a plunger slideably received in said mounting member bore and biased toward the latch state with a restorative force so that said plunger is moveable between a retracted position and an extended position, said plunger having a port therethrough that registers with the passageway when in the retracted position so that in the release state the cable is received through said port for sliding movement in the passageway;

(E) advancing said latch mechanism to the release state by adjusting the plunger to register said port with said passageway to enable the cable to slide in the passageway and so as to move said lid between the open and closed positions; and (F) advancing said latch mechanism to the latch state by allowing said latch mechanism to return to the latch state under influence of said restorative force such that said plunger binds against the cable to resist sliding movement thereof in the passageway.

12. A receptacle adapted to be suspended from a support member for the care and maintenance of living things, comprising:

(A) a housing having an interior with an access opening therein;

(B) a lid adapted to be moved from an open position permitting access to the interior through the access opening and a closed position enclosing the interior such that said housing and said lid together form an assembled unit;

(C) a mounting structure associated with said lid having a passageway extending axially therethrough, said mounting structure having a bore formed partially therethrough that intersects said passageway;

(D) a flexible cable secured at a first end portion to said housing and having an opposite second end portion adapted to secure to the support member, said cable extending through the passageway in said mounting structure; and (E) a latch mechanism including a plunger slideably received in the bore and biased outwardly from the bore with a restorative force so that said plunger can move between a retracted position and an extended position said plunger having a port therethrough that receives said cable, said port registering with said passageway when said plunger is in the retracted position so as to allow sliding movement of said cable in the passageway, so that the lid can be moved between the closed and open positions, said plunger operative to bind against said cable when said plunger is in the extended position such that sliding movement of said cable in the passageway is resisted and the lid is retained as positioned, at or between one of the open and closed positions.

13. The receptacle according to claim 12 wherein said assembled unit is a bird feeder.

14. The receptacle according to claim 12 wherein said assembled unit is selected from a group consisting of bird houses, bird feeders, butterfly feeders, and bird baths.

15. The receptacle according to claim 12 wherein said mounting structure is configured as a finial for said lid.

16. The receptacle according to claim 12 wherein said assembled unit is selected from a group consisting of bird houses, bird feeders, butterfly feeders, and bird baths.

17. The receptacle according to claim 15 wherein said finial includes a threaded shaft and said lid has a lid opening sized and adapted to receive said shaft therethrough, and including a threaded fastener adapted to threadably engage said shaft to retain said finial on said lid.

18. The receptacle according to claim 12 wherein said bore is transverse to said passageway and said plunger is biased outwardly by a spring element fitted within said transverse bore.

19. The receptacle according to claim 12 wherein said bore is transverse to said passageway.

* * * * *